Patented Oct. 28, 1924.

1,513,200

UNITED STATES PATENT OFFICE.

MARVIN J. UDY, OF NIAGARA FALLS, NEW YORK, ASSIGNOR, BY MESNE ASSIGNMENTS, TO ELECTRO METALLURGICAL COMPANY, OF NEW YORK, N. Y., A CORPORATION OF WEST VIRGINIA.

TREATMENT OF VANADIUM ORES.

No Drawing. Application filed October 25, 1922. Serial No. 596,882.

*To all whom it may concern:*

Be it known that I, MARVIN J. UDY, a citizen of the United States, residing at Niagara Falls, in the county of Niagara and State of New York, have invented certain new and useful Improvements in the Treatment of Vanadium Ores, of which the following is a specification.

This invention relates to the separation of vanadium from ores containing vanadium and relatively large amounts of other metals, especially copper and lead, by methods employing fusion with alkali. The improved process is based principally upon the discovery that the addition of sulfur or sulfur-bearing materials in the alkali fusion of such ores materially facilitates the separation of other metals from the vanadium and causes the formation of readily soluble compounds of the latter.

In a carrying out the process of the present invention in a preferred form, the ore is smelted with sulfur, a carbonaceous reducing agent, and an alkali, especially an alkali metal carbonate. Sulfur should be present in amount at least sufficient to combine with the copper in the ore to form cuprous sulfid (copper matte). Instead of elementary sulfur, pyrite or other material capable of supplying sulfur may be used. Powdered coal or other suitable reducing agent should be added to the charge in quantity adequate to reduce completely all the lead compounds. The carbonate, usually soda ash, should be in some excess of the amount theoretically necessary for the formation of normal sodium vanadate with the vanadium of the ore. In some cases scrap iron may be added to assist in the reduction and insure its completeness.

The charge is thoroughly mixed and smelted in any suitable furnace, the temperature usually required being about 950° C. This temperature is somewhat lower than that necessary when sulfur is not used. When fusion is complete the charge is poured and allowed to cool. During cooling, stratification takes place, with formation of a metallic layer, usually composed chiefly of lead, a layer consisting largely of copper matte, and a layer of slag. Substantially all the vanadium is in the slag.

If iron is used in the reduction, care should be taken not to add so much that it enters the slag with the result of thickening it and impairing stratification.

After mechanical separation from the lead and matte, the slag is crushed, leached with water, and filtered. The insoluble residue contains lead and copper and may be marketed as such or reworked for any vanadium which may have escaped extraction.

The filtered solution containing soluble vanadium compounds, principally sodium vanadates, is treated in any suitable way for the separation of vanadium. For example, the solution may be neutralized with sulfuric acid, sodium chlorate added, and the solution boiled. Under these conditions vanadium is precipitated as the pentoxid substantially free from phosphorous, arsenic, and other impurities.

The lead and copper matte may be conveniently separated and form a valuable by-product of the operation.

The invention is not limited to treatment of any particular vanadium containing material. Ores containing widely varying amounts of vanadium associated with copper, lead, or other substances, may be advantageously treated.

When the procedure outlined above is followed, the recoveries of vanadium average about 90–95%. Lead and copper are also recovered with approximate completeness.

In alkali fusions of vanadium ores containing copper, as heretofore conducted, much of the copper is slagged as well as the vanadium, necessitating chemical treatment of the slag for separating the metals. Also, the vanadium compounds do not in general occur in the slag in readily soluble form. When sulfur is used in accordance with the present process, a mechanical separation of the copper in the form of matte is easily effected, and the vanadium compounds are substantially completely extractible by water. The greater solubility of the vanadium compounds may result from the fact that the fusion can usually be conducted at a lower temperature when sulfur is present.

The preferred procedure as herein described materially facilitates the recovery of vanadium, and as the additional expense entailed by the use of sulfur is small, the process is commercially advantageous. This preferred procedure is susceptible to various modifications within the scope of the appended claims.

I claim:

1. Process of treating vanadium ore containing metals other than vanadium, which comprises mixing the ore with an alkali and a material capable of supplying sulfur to combine with a metal to be separated from the vanadium, and heating the charge to fusion.

2. Process of treating vanadium ore containing copper, which comprises mixing the ore with an alkali and with sulfur in amount sufficient to combine with the copper, heating the charge to fusion to form copper matte, and separating the matte from vanadium-containing material.

3. Process of treating vanadium ore containing copper and lead, comprising smelting the ore with an alkali, sulfur, and a carbonaceous reducing agent, whereby copper matte, lead, and slag containing vanadium in water soluble form are produced.

4. Process of treating vanadium ore containing copper and lead, comprising heating the ore, sodium carbonate, sulfur, and a carbonaceous reducing agent to a state of fusion, allowing the fused product to stratify and cool, and mechanically separating the vanadium-containing stratum for recovery of vanadium therefrom.

5. Process for converting the vanadium content of an ore into water soluble form, which comprises mixing the ore with sulfur and with an alkali metal carbonate in amount at least sufficient to form sodium vanadate with the vanadium of the ore, and heating the charge to fusion.

6. Process of treating ores containing vanadium, copper, and lead, comprising fusing the ore with an alkali and a material capable of supplying sulfur to combine with the copper, allowing the fused product to stratify and cool, mechanically separating the strata containing lead, copper, and vanadium, and extracting the vanadium by leaching with water.

In testimony whereof, I affix my signature.

MARVIN J. UDY.